United States Patent
Wang et al.

(10) Patent No.: US 10,114,274 B2
(45) Date of Patent: Oct. 30, 2018

(54) HEAT DISSIPATING MODULE HAVING TURBULENT STRUCTURES

(71) Applicant: Coretronic Corporation, Hsin-Chu (TW)

(72) Inventors: Chi-Chuan Wang, Hsin-Chu (TW); Po-Sheng Huang, Hsin-Chu (TW); Shang-Hsuang Wu, Hsin-Chu (TW); Tsung-Ching Lin, Hsin-Chu (TW); Wen-Yen Chung, Hsin-Chu (TW); Jhih-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 700 days.

(21) Appl. No.: 14/753,031

(22) Filed: Jun. 29, 2015

(65) Prior Publication Data

US 2016/0178283 A1 Jun. 23, 2016

(30) Foreign Application Priority Data

Dec. 22, 2014 (TW) .............................. 103144758 A (51) Int. Cl.
*G03B 21/16* (2006.01)
*F28F 13/12* (2006.01)
(Continued)

(52) U.S. Cl.
CPC ......... *G03B 21/16* (2013.01); *F28D 15/0275* (2013.01); *F28F 1/32* (2013.01); *F28F 13/12* (2013.01)

(58) Field of Classification Search
CPC ......... F28D 15/0275; F28F 1/32; F28F 13/12; G03B 21/16
See application file for complete search history.

(56) References Cited

U.S. PATENT DOCUMENTS

2001/0037875 A1 11/2001 Guerrero
2005/0190538 A1 9/2005 Huang
(Continued)

FOREIGN PATENT DOCUMENTS

CN 2530236 1/2003
CN 2636421 8/2004
(Continued)

OTHER PUBLICATIONS

"Office Action of Taiwan Counterpart Application," dated Feb. 22, 2016, p. 1-p. 10.

*Primary Examiner* — Sultan Chowdhury
*Assistant Examiner* — Magda Cruz
(74) *Attorney, Agent, or Firm* — JCIPRNET (57) ABSTRACT

A heat dissipation module includes a heat dissipation fin set. The heat dissipation fin set includes a plurality of heat dissipation fins, wherein these heat dissipation fins are stacked on each other, and each of the heat dissipation fins has a front side, a rear side opposite to the front side and at least one turbulent structure set. The turbulent structure set is located between the front side and the rear side and includes a plurality of first turbulent structures. The first turbulent structures are arranged from the front side to the rear side in sequence. A heat dissipation airflow flows from the front side toward the turbulent structure set along a flowing direction, and passes through the turbulent structure set to flow toward the rear side. An extending direction of each of the first turbulent structures is tilted relative to the flowing direction.

17 Claims, 4 Drawing Sheets

(51) Int. Cl.
*F28D 15/02* (2006.01)
*F28F 1/32* (2006.01)

(56) References Cited

U.S. PATENT DOCUMENTS

| | | | |
|---|---|---|---|
| 2010/0053566 A1* | 3/2010 | Yang | G03B 21/16 |
| | | | 353/58 |
| 2010/0147493 A1* | 6/2010 | Dai | F28D 15/0266 |
| | | | 165/104.26 |
| 2013/0228313 A1 | 9/2013 | Fried | |
| 2013/0250517 A1 | 9/2013 | Yang et al. | |

FOREIGN PATENT DOCUMENTS

| | | |
|---|---|---|
| CN | 101986203 | 3/2011 |
| CN | 202652813 | 1/2013 |
| TW | 200850123 | 12/2008 |
| TW | M354319 | 4/2009 |
| TW | M356102 | 5/2009 |
| TW | M363618 | 8/2009 |
| TW | M408069 | 7/2011 |
| TW | M467084 | 12/2013 |
| WO | 0179776 | 10/2001 |

* cited by examiner

HEAT DISSIPATING MODULE HAVING TURBULENT STRUCTURES

CROSS-REFERENCE TO RELATED APPLICATION

This application claims the priority benefit of Taiwan application serial no. 103144758, filed on Dec. 22, 2014. The entirety of the above-mentioned patent application is hereby incorporated by reference herein and made a part of this specification.

BACKGROUND OF THE INVENTION

1. Field of the Invention

The invention relates to a heat dissipation module and a projection device having the heat dissipation module, and relates particularly to a heat dissipation module having turbulent structures and a projection device having the heat dissipation module.

2. Description of Related Art

A projection device is a display device used for producing large sized images. The principle of image formation of the projection device is converting an illumination light beam generated by a light source into an image light beam by a light valve, and then projecting the image light beam onto a projection screen or a wall through a projection lens. Because components such as the light source and the light valve in an optical engine of the projection device generate heat when operations, a heat dissipating module is required to be disposed within the projection device to dissipate the heat of these heat generating components to prevent the device from overheating. The heat dissipating module may include a heat dissipation fin set connected to the heat generating component, in which the heat generated by the heat generating component is transmitted to the heat dissipation fin set, and by using natural convection or a forced convection provided by a fan, the heat is transferred from the heat dissipation fin set to the outside of the projection device.

Along with advances in projection technology, a requirement for a high brightness, low noise and small volume projection device increases. Generally speaking, the higher the brightness of the light source of the projection device is, the more heat the projection device generates. If the rotation speed of the fan is increased to correspondingly strengthen the heat dissipation airflow, noise would increase. Increasing the volume of the heat dissipation fin set to enhance the heat dissipation efficiency is a method for overcoming the above problem. However, this increases the weight and volume of the projection device and significantly lowers the convenience and safety of the installation and the use of the projection device.

Chinese patent number CN 202652813U discloses a heat dissipation device, the discrete protrusion portions of the heat dissipation fin are aligned to form a V shape to guide the airflow blown in by the fan to the heat pipe at the two sides of the protrusion portions. United States patent application publication number US20050190538A1 discloses a heat dissipation structure, the first disturbing portion and the second disturbing portion of the heat dissipating plate are aligned to form a V shape. WIPO patent application publication number WO01/79776A1 discloses a heat dissipation structure in which the periphery of the notch of the heat dissipation plate has a flange adapted to provide spacing between adjacent heat dissipation plates.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides a heat dissipating module which enhances the heat dissipation efficiency.

The invention provides a projection device, a heat dissipating module thereof enhances the heat dissipation efficiency.

The other objectives and advantages of the invention may be further understood from the technical features disclosed in the invention.

In order to achieve one, a part, all of the above objectives or other objectives, an embodiment of the invention provides a heat dissipating module, adapted to use in a heat dissipation airflow along a flowing direction, including a heat dissipation fin set. The heat dissipation fin set includes a plurality of heat dissipation fins, wherein the heat dissipation fins are stacked on each other, each of the heat dissipation fins has a front side, a rear side opposite to the front side and at least one turbulent structure set. The turbulent structure set is located between the front side and the rear side and has a plurality of first turbulent structures, and the first turbulent structures are arranged from the front side to the rear side in sequence. When the heat dissipating module used in the heat dissipation airflow, the heat dissipation airflow flows from the front side toward the turbulent structure set along the flowing direction, and passes through the turbulent structure set to flow toward the rear side. An extending direction of each of the first turbulent structures is tilted relative to the flowing direction.

In an embodiment of the invention, the dissipating module further includes a fan. The fan is adapted to provide the heat dissipation airflow.

In an embodiment of the invention, the first turbulent structures are a plurality of grooves and the grooves are arranged parallel to each other with intervals.

In an embodiment of the invention, the turbulent structure set further comprises a plurality of second turbulent structures. The second turbulent structures are arranged from the front side to the rear side in sequence and aligned with the first turbulent structures respectively. An extending direction of each of the second turbulent structures is tilted relative to the flowing direction. Each of the first turbulent structures and the corresponding second turbulent structures are rendered in a V shape structure. Each of the V shape structures has a narrow end, and each of the narrow ends face the front side.

In an embodiment of the invention, the second turbulent structures are a plurality of grooves and the grooves are arranged parallel to each other with intervals.

In an embodiment of the invention, each of the first turbulent structures has a first end and a second end opposite to each other, and each of the second turbulent structures has a third end and a fourth end opposite to each other. Each of the first ends and the corresponding third ends constitute the corresponding narrow end. A distance between each of the narrow ends and the front side is smaller than a distance between the corresponding second end and the front side and smaller than a distance between the corresponding fourth end and the front side.

In an embodiment of the invention, each of the first ends and the corresponding third end are connected together to form a tip, or each of the first ends and the corresponding third end are separated.

In an embodiment of the invention, the dissipating module further includes at least one heat pipe. Each of the heat dissipation fins has at least one opening, and the heat pipe passes through the opening.

In an embodiment of the invention, the opening is disposed at the narrow end of at least one of the V shape structures of the turbulent structure set.

In an embodiment of the invention, the number of the at least one turbulent structure set is a plurality. The turbulent structure sets are arranged sequentially along a direction perpendicular to the flowing direction.

In an embodiment of the invention, the dissipating module further includes at least one heat pipe and a heat diffusion structure. The heat diffusion structure is adapted to dispose on a heat generating element, and the heat pipe is connected between the heat diffusion structure and the heat dissipation fin set.

In an embodiment of the invention, each of the heat dissipation fins has at least one opening. The heat pipe passes through the opening, and the opening is disposed at the turbulent structure set.

In an embodiment of the invention, a periphery of the opening has a folding wall, and the folding wall of the opening is adapted to support another adjacent one of the heat dissipation fins.

In an embodiment of the invention, each of the heat dissipation fins has at least one side edge. The side edge is connected between the front side and the rear side and has a folding wall, and the folding wall of each of the heat dissipation fins is adapted to separate another adjacent one of the heat dissipation fins.

In an embodiment of the invention, each of the heat dissipation fins has at least one side edge. The side edge is connected between the front side and the rear side, and the flowing direction is substantially parallel to the side edge.

In order to achieve one, a part, all of the above objectives or other objectives, an embodiment of the invention provides a projection device. The projection device includes an outer casing, an optical engine and the above heat dissipating module. The optical engine is disposed in the casing. The optical engine includes a light source module, a light valve and a projection lens. The light source module is adapted to emit an illumination light beam, the light valve is adapted to convert the illumination light beam into an image light beam, and the projection lens is adapted to project the image light beam. The heat dissipating module as claimed in claim 1 is disposed in the outer casing and adapted to perform heat dissipation for the optical engine.

The embodiments of the invention have at least one of the features below. Each of the heat dissipation fins of the heat dissipating module has a plurality of turbulent structures, and an extending direction of each of the turbulent structures is tilted relative to the flowing direction of the heat dissipating airflow. When the heat dissipation airflow flows into the turbulent structures, each of the turbulent structures disrupts the boundary layer of the heat dissipation airflow and generates a vortex. The vortexes moves obliquely toward the rear side of the heat dissipation fins by the guidance of the tilted configuration of the turbulent structures, to increase the heat convection efficiency of the heat dissipation airflow at the heat dissipation fins. In this way, the heat dissipation ability of the heat dissipating module may be enhanced effectively without increasing the rotation speed of the fan and the volume of the heat dissipation fin set, to satisfy the high brightness, low noise and small volume design trends of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
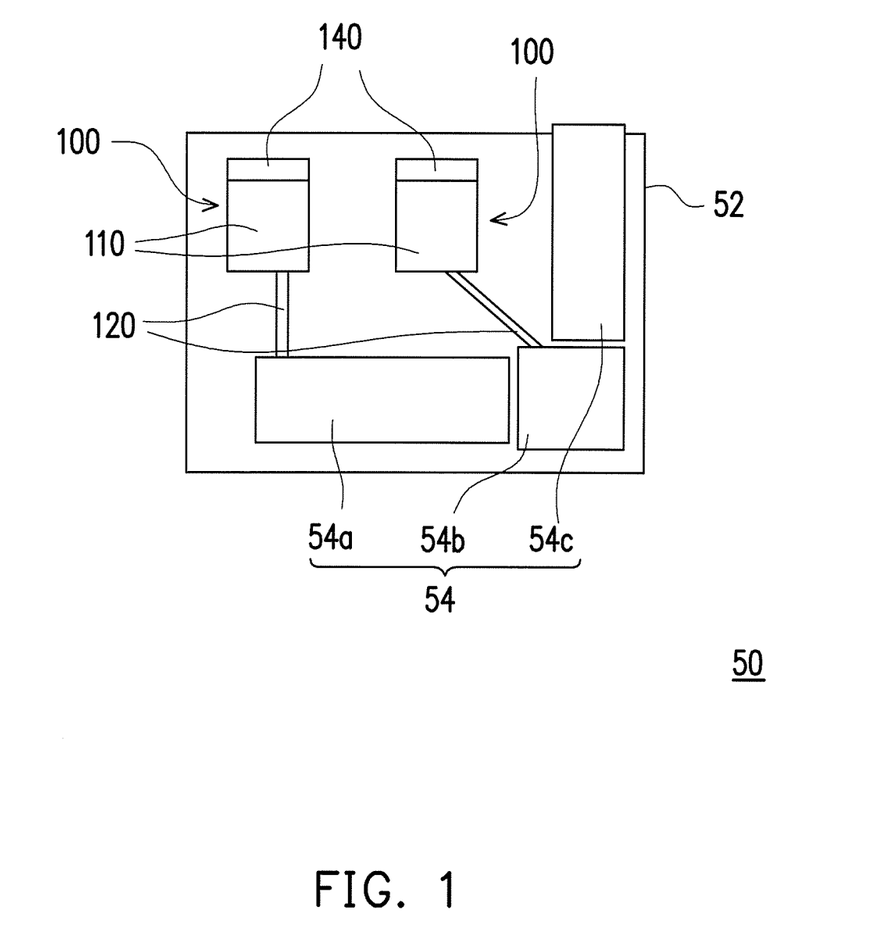
FIG. 1 is a schematic diagram of a projection device according to an embodiment of the invention.

FIG. 1 is a schematic diagram of a projection device according to an embodiment of the invention. Referring to FIG. 1, a projection device 50 includes a outer casing 52, an optical engine 54 and at least one heat dissipating module 100 (two are shown). The optical engine 54 is disposed in the outer casing 52 and includes a light source module 54a, a light valve 54b and a projection lens 54c. The light source module 54a is adapted to emit an illumination light beam. The light valve 54b is adapted to convert the illumination light beam into an image light beam. The projection lens 54c is adapted to project the image light beam. The light source module 54a, for example, includes at least one of a light emitting diode (LED), a laser diode, an ultra-high pressure mercury lamp or other suitable light source. The light valve 54b may be at least one of a digital micromirror device (DMD), a liquid crystal on silicon (LCOS) or other suitable element. In the present embodiment, the light source module 54a and the light valve 54b are heat generating elements, and two heat dissipating modules 100 are exemplarily disposed in the outer casing 52 and are connected to the light source module 54a and the light valve 54b respectively for the light source module 54a and the light valve 54b to perform heat dissipation through the two heat dissipating modules 100. However, the number of the heat dissipating modules 100 and the elements connected thereto should not be construed as a limitation to the invention. The heat dissipating module 100 may also be connected to other heat generating elements, such as a power supply or a ballast, to perform heat dissipation.

Figure 2:
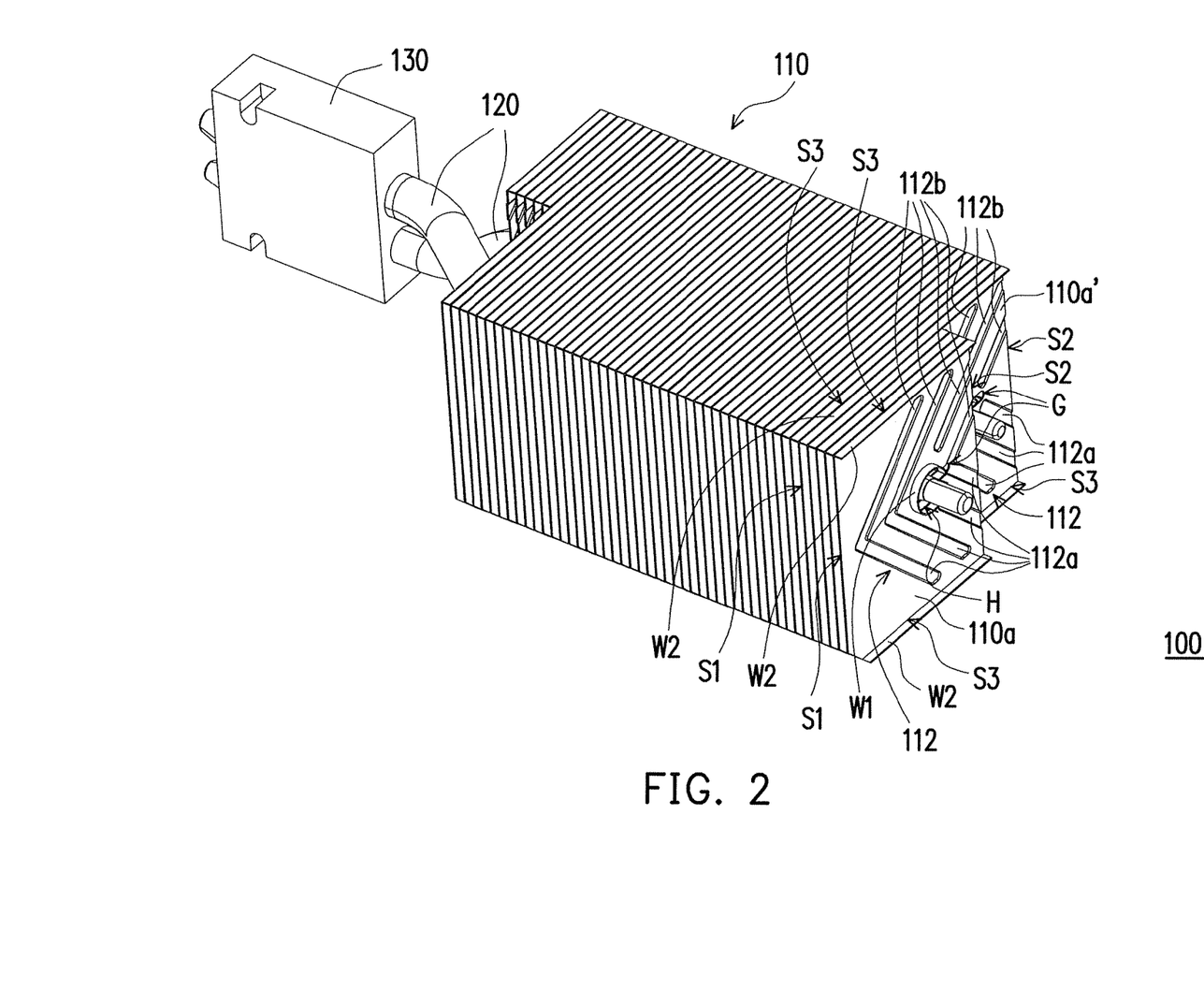
FIG. 2 is a three-dimensional diagram of a heat dissipating module of FIG. 1.
Figure 3:
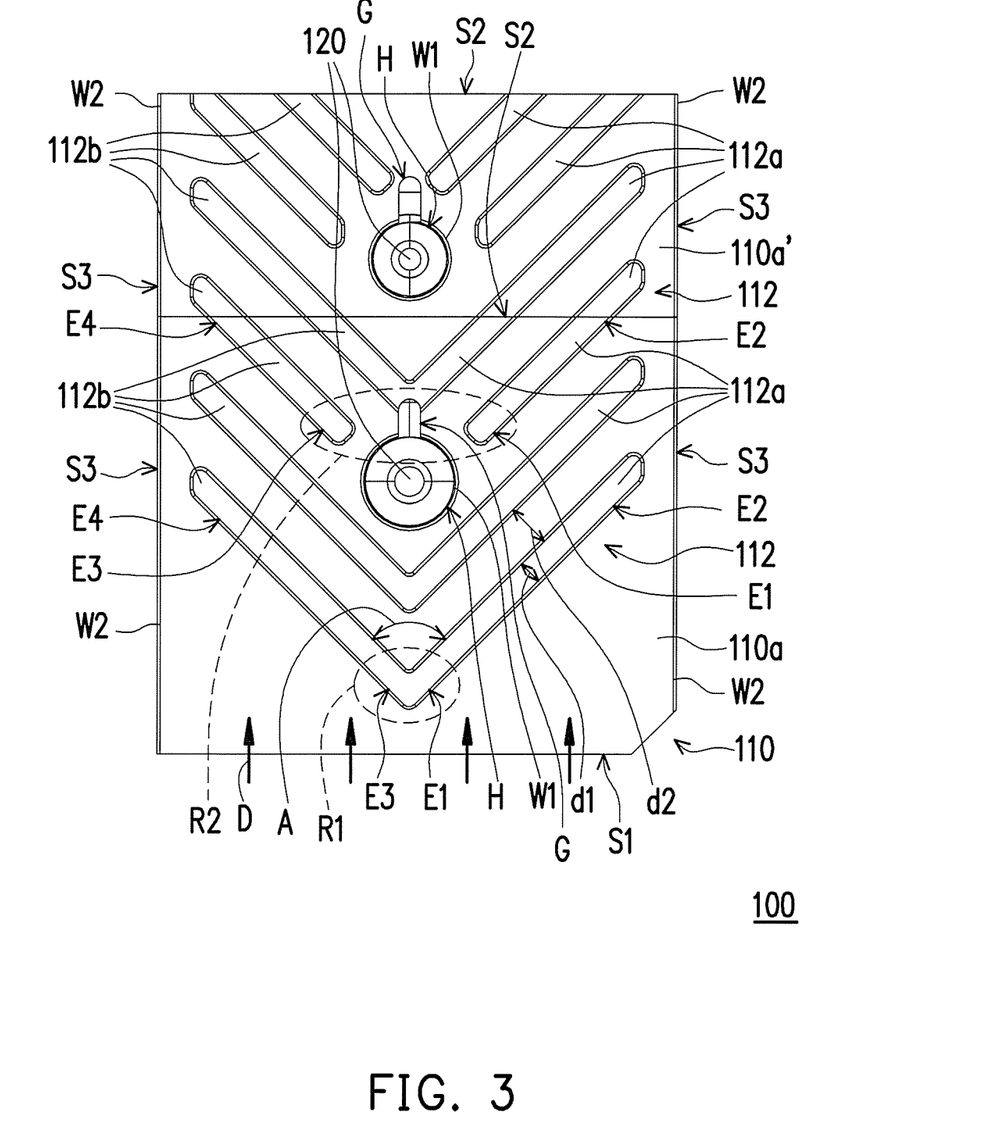
FIG. 3 is a side view of the heat dissipating module of FIG. 2.

FIG. 2 is a three-dimensional diagram of a heat dissipating module of FIG. 1. FIG. 3 is a side view of the heat dissipating module of FIG. 2. Referring to FIG. 2 and FIG. 3, the heat dissipating module 100 includes a heat dissipation fin set 110. In one embodiment, the heat dissipating module 100 may further include at least one heat pipe 120 (two are shown for example in FIG. 2 and FIG. 3) and a heat diffusion structure 130. The heat diffusion structure 130 is disposed on the heat generating element (for example the light source module 54a or the light valve 54b as exemplarily shown in FIG. 1). The heat pipe 120 is connected between the heat diffusion structure 130 and the heat dissipation fin set 110, such that the heat generated by the heat generating element is transmitted to the heat dissipation fin set 110 through the heat diffusion structure 130 and the heat pipe 120. In one embodiment, the heat diffusion structure 130, for example, is a heat exchanger, however, the invention is not limited thereto.

The heat dissipation fin set 110 includes a plurality of heat dissipation fins (only a heat dissipation fin 110a and a heat dissipation fin 110a' are labelled illustratively) stacked on each other. The size of each of the heat dissipation fins 110a should not be construed as a limitation to the invention. For example, the heat dissipation fin 110a is smaller in size than the heat dissipation fin 110a', however in other embodiments, adjustments may be made to the size of each of the heat dissipation fins according to, for example, the configuration of the internal space in the projection device. Each of the heat dissipation fins 110a, 110a' has a front side S1, a rear side S2 opposite to the front side S1 and a turbulent structure set 112. The turbulent structure set 112 is located between the front side S1 and the rear side S2 and includes a plurality of first turbulent structures 112a and, in another embodiment, may further have a plurality of second turbulent structures 112b. The first turbulent structures 112a are arranged from the front side S1 to the rear side S2 in sequence and the second turbulent structures 112b are arranged from the front side S1 to the rear side S2 in sequence and aligned with the first turbulent structures 112a respectively.

In the present embodiment, the first turbulent structures 112a, for example, are a plurality of grooves formed by a punching process and the grooves are arranged parallel to each other with intervals. Similarly, in one embodiment, the second turbulent structures 112b, for example, are a plurality of grooves formed by a punching process and the grooves are arranged parallel to each other with intervals. A width d1 of each of the grooves (labelled in FIG. 3), for example, is smaller than or equal to 10 millimeters and a width d2 (labelled in FIG. 3) between two adjacent grooves, for example, is greater than or equal to 1 millimeters. The maximum depth of each of the grooves, for example, is ½ of the thickness of the heat dissipation fins 110a, 110a', however the invention is not limited thereto. In other embodiments, the turbulent structures may be formed by other suitable processes and may be a structure of other suitable form and it should not be construed as a limitation to the invention. In one embodiment, the width d1 is the same for each groove (i.e. the first turbulent structures 112a and/or the first turbulent structures 112b), the width d2 is the same between any two adjacent grooves (i.e. the first turbulent structures 112a and/or the first turbulent structures 112b), and the depth is the same for each groove (i.e. the first turbulent structures 112a and/or the first turbulent structures 112b), however, the invention is not limited thereto. In another embodiment, for example, each groove may have different width, or some grooves have the same first width and some grooves have the same second width different from the first width. In one embodiment, for example, the width d2 between any two adjacent grooves may not be the same, or the width between any two grooves of certain set of grooves is different from the width between any two grooves of another certain set of grooves.

Referring to FIG. 1 to FIG. 3, in the present embodiment, the heat dissipating module 100 as shown in FIG. 1 may further include a fan 140, adapted to provide a heat dissipation airflow to the corresponding heat dissipation fin set 110 for performing heat dissipation. The fan 140 of the present embodiment, for example, is disposed corresponding to a side of the heat dissipation fin set 110, however it should not be construed as a limitation to the invention and the fan 140 may also be disposed at other suitable position within the projection device 50. The heat dissipation airflow flows from the front side S1 toward the turbulent structure set 112 along a flowing direction D, and passes through the turbulent structure set 112 to flow toward the rear side S2. As shown in FIG. 3, an extending direction of each of the first turbulent structures 112a is tilted relative to the flowing direction D. Similarly, an extending direction of each of the second turbulent structures 112b is tilted relative to the flowing direction D. In one embodiment, as shown in FIG. 3, an extending direction of each of the first turbulent structures 112a is tilted relative to the front side S1, and an extending direction of each of the second turbulent structures 112b is tilted relative to the front side S1.

In the embodiment as shown in FIG. 3, when the heat dissipation airflow flows into the first turbulent structures 112a and the second turbulent structures 112b, each of the first turbulent structures 112a and each of the second turbulent structures 112b disrupt the boundary layer of the heat dissipation airflow and generates a vortex. The vortexes moves obliquely toward the rear side S2 of the heat dissipation fins 110a, 110a' by the guidance of the tilted configuration of the first turbulent structures 112a and the second turbulent structures 112b, to increase the heat convection efficiency of the heat dissipation airflow at the heat dissipation fins 110a, 110a'. In this way, the heat dissipation ability of the heat dissipating module 100 may be enhanced effectively without increasing the rotation speed of the fan 140 and the volume of the heat dissipation fin set 110, to satisfy the high brightness, low noise and small volume design trends of the projection device.

Referring to FIG. 3, in the present embodiment, each of the first turbulent structures 112a and the corresponding second turbulent structures 112b, for example, are rendered in a V shape structure to guide the heat dissipation airflow effectively, wherein an angle A between the first turbulent structure 112a and the second turbulent structure 112b, for example, is between 30~75 degrees, however it should not be construed as a limitation to the invention. More specifically, each of the first turbulent structures 112a has a first end E1 and a second end E2 opposite to each other (2 first ends E1 and 2 second ends E2 are labelled illustratively in FIG. 3) and each of the second turbulent structures 112b has a third end E3 and a fourth end E4 opposite to each other (2 third ends E3 and 2 fourth ends E4 are labelled illustratively in FIG. 3). Each of the first ends E1 and the corresponding third ends E3 constitute a narrow end of the V shape structure, and a distance between each of the narrow ends and the front side S1 is smaller than a distance between the corresponding second end E2 and the front side S1 and smaller than a distance between the corresponding fourth end E4 and the front side S1. In other words, the narrow end of the V shape structure is disposed to face toward the front side S1 for the heat dissipation airflow to flow obliquely from the narrow end toward the second end E2 and the fourth end E4 by the guidance of the V shape structure.

Each of the heat dissipation fins 110a, 110a' has at least one opening H and the heat pipe 120 passes through the opening H, wherein the opening H is disposed at the narrow end of at least one of the V shape structures of the turbulent structure set 112 (as shown in a region R2 of FIG. 3). By this arrangement, the heat dissipation airflow flowing into the turbulent structure set 112 along the direction D will move obliquely along the corresponding first turbulent structures 112a and the second turbulent structures 112b by the blocking and guiding of the heat pipe 120 to increase the heat convection efficiency of the heat dissipation airflow.

The first end E1 and the corresponding third end E3 of a portion of the V shape structures in the present embodiment are connected together (as shown in a region R1 of FIG. 3) such that the narrow end forms a tip, however the invention is not limited thereto, and the first end E1 and the corresponding third end E3 of a portion of the V shape structures are separated and are not connected together (as shown in a region R2 of FIG. 3) such that the narrow end does not form a tip, to facilitate the accommodation of the opening H and the heat pipe 120. In addition, in other embodiment, the turbulent structure set 112 on each of the heat dissipation fins 110a, 110a' may include only the plurality of first turbulent structures 112a arranged in sequence or include only the plurality of second turbulent structures 112b arranged in sequence, and it should not be construed as a limitation to the invention.

In one embodiment, the periphery of the opening H as shown in FIG. 2 and FIG. 3 further has a folding wall W1, adapted to support another adjacent one of the heat dissipation fins 110a or heat dissipation fins 110a'. A solder guiding part G may further be selectively disposed on the folding wall W1 (for example by forming an opening or a through hole at the folding wall W1, and extending and connecting to the groove on the heat dissipation fin) to guide a solder (for example, tin or a tin alloy) into the opening H for fixing the heat pipe 120 with the heat dissipation fins 110a or heat dissipation fins 110a'. In addition, each of the heat dissipation fins 110a, 110a' has two side edges S3. Each side edge S3 is connected between the front side S1 and the rear side S2 and, in one embodiment, may further have a folding wall W2 adapted to separate another adjacent one of the heat dissipation fins 110a or heat dissipation fins 110a' for the heat dissipation airflow to pass through. In one embodiment, as shown in FIG. 3, the flowing direction D of the heat dissipation airflow is substantially parallel with the side edge S3.

Figure 4:
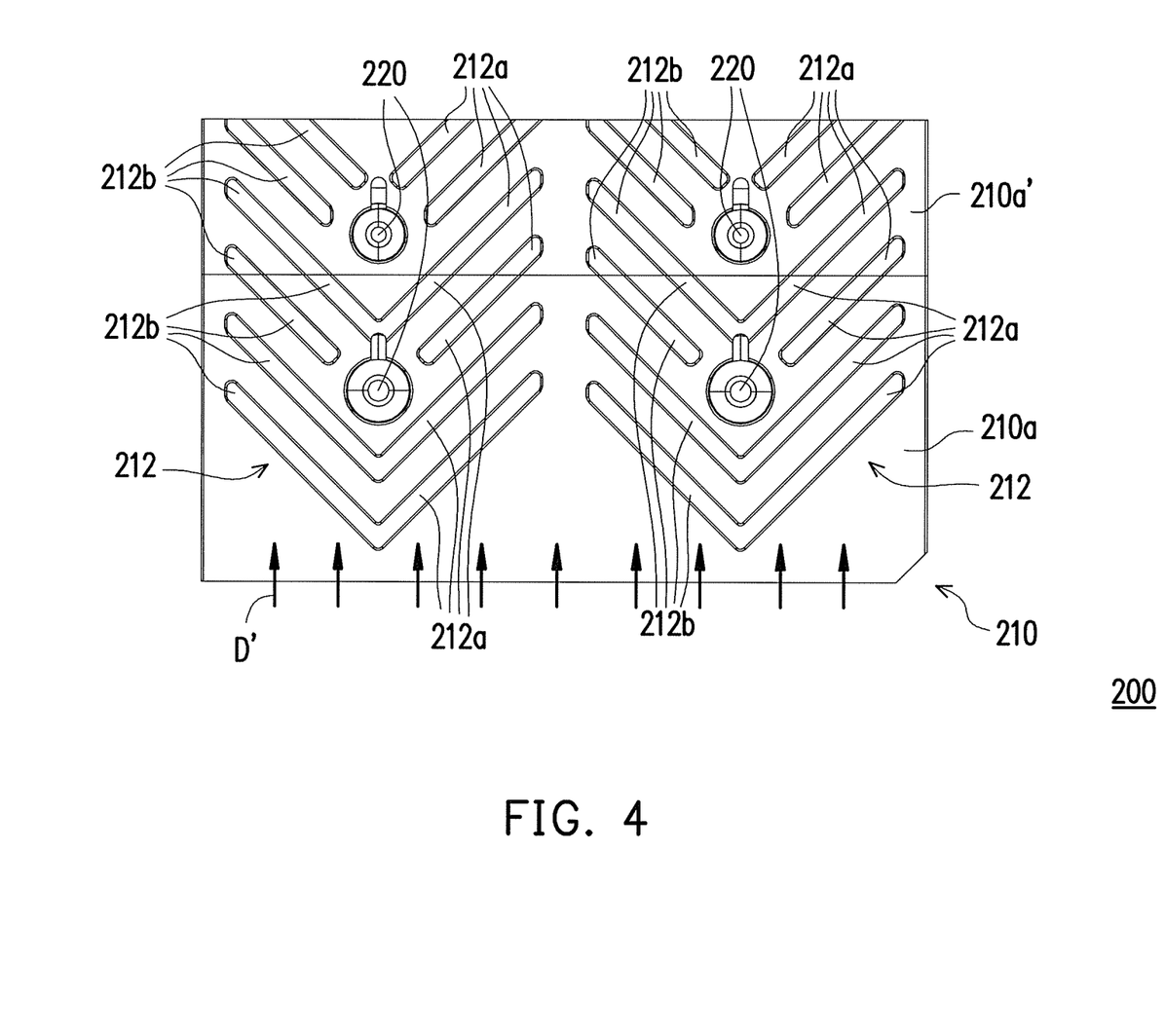
FIG. 4 is a side view of a heat dissipating module according to another embodiment of the invention.

The number of turbulent structure sets 112 on each of the heat dissipation fins 110a, 110a' should not be construed as a limitation to the invention and examples will be described below accompanied by drawings. FIG. 4 is a side view of a heat dissipating module according to another embodiment of the invention. In a heat dissipating module 200 of FIG. 4, a heat dissipation fin set 210, heat dissipation fins 210a, heat dissipation fins 210a', each of the turbulent structure sets 212, each of the first turbulent structures 212a, each of the second turbulent structures 212b, a heat pipe 220 and a flowing direction D' of the heat dissipating airflow are similar to the heat dissipation fin set 110, the heat dissipation fins 110a, the heat dissipation fins 110a', each of the turbulent structure sets 112, each of the first turbulent structures 112a, each of the second turbulent structures 112b, the heat pipe 120 and the flowing direction D of the heat dissipating airflow of FIG. 3, and will not be repeated here. The difference between the heat dissipating module 200 and the heat dissipating module 100 is that a number of the turbulent structure sets 212 is a plurality (two are shown), and the turbulent structure sets 212 are arranged sequentially along a direction perpendicular to the flowing direction D' (or the side edge of heat dissipation fins 210a, 210a'). In the present embodiment, the first turbulent structures 212a of one of the turbulent structure sets 212, for example, are aligned with the second turbulent structures 212b of the adjacent turbulent structure set 212. However, in other embodiments, two adjacent turbulent structure sets 212 may not be aligned with each other, the number of the turbulent structures in each of the turbulent structure sets 212 may be different, and there also may be other suitable number of turbulent structure sets 212, and the invention is not limited thereto.

In summary, the embodiments of the invention have at least one of the features below. Each of the heat dissipation fins of the heat dissipating module has a plurality of turbulent structures, and an extending direction of each of the turbulent structures is tilted relative to the flowing direction of the heat dissipating airflow along the heat dissipating module. In this way, when the heat dissipation airflow flows into the turbulent structures, each of the turbulent structures disrupts the boundary layer of the heat dissipation airflow and generates a vortex. The vortexes moves obliquely toward the rear side of the heat dissipation fins by the guidance of the tilted configuration of the turbulent structures, to increase the heat convection efficiency of the heat dissipation airflow at the heat dissipation fins. In this way, the heat dissipation ability of the heat dissipating module may be enhanced effectively without increasing the rotation speed of the fan and the volume of the heat dissipation fin set, to satisfy the high brightness, low noise and small volume design trends of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A heat dissipating module, adapted to use in a heat dissipation airflow along a flowing direction, comprising:
   a heat dissipation fin set, comprising a plurality of heat dissipation fins, wherein the heat dissipation fins are stacked on each other, each of the heat dissipation fins has a front side, a rear side opposite to the front side and at least one turbulent structure set, the turbulent structure set is located between the front side and the rear side and has a plurality of first turbulent structures, the first turbulent structures are arranged from the front side to the rear side in sequence, such that when the heat dissipating module used in the heat dissipation airflow, the heat dissipation airflow flows from the front side toward the turbulent structure set along the flowing direction, and passes through the turbulent structure set to flow toward the rear side, and an extending direction of each of the first turbulent structures is tilted relative to the flowing direction,
   wherein the turbulent structure set further comprises a plurality of second turbulent structures, the second turbulent structures are arranged from the front side to the rear side in sequence and aligned with the first turbulent structures respectively, an extending direction of each of the second turbulent structures is tilted relative to the flowing direction, each of the first turbulent structures and the corresponding second turbulent structures are rendered in a V shape structure, each of the V shape structures has a narrow end, and each of the narrow ends face the front side,
   wherein each of the first turbulent structures has a first end and a second end opposite to each other, each of the second turbulent structures has a third end and a fourth end opposite to each other, each of the first ends and the corresponding third ends constitute the corresponding narrow end, a distance between each of the narrow ends and the front side is smaller than a distance between the corresponding second end and the front side and smaller than a distance between the corresponding fourth end and the front side.

2. The heat dissipating module as claimed in claim 1, further comprising a fan, wherein the fan is adapted to provide the heat dissipation airflow.

3. The heat dissipating module as claimed in claim 1, wherein the first turbulent structures are a plurality of grooves and the grooves are arranged parallel to each other with intervals.

4. The heat dissipating module as claimed in claim 1, wherein the second turbulent structures are a plurality of grooves and the grooves are arranged parallel to each other with intervals.

5. The heat dissipating module as claimed in claim 1, wherein each of the first ends and the corresponding third end are connected together to form a tip.

6. The heat dissipating module as claimed in claim 1, wherein each of the first ends and the corresponding third end are separated.

7. The heat dissipating module as claimed in claim 1, further comprising at least one heat pipe, wherein each of the heat dissipation fins has at least one opening, and the heat pipe passes through the opening.

8. The heat dissipating module as claimed in claim 7, wherein the opening is disposed at the narrow end of at least one of the V shape structures of the turbulent structure set.

9. The heat dissipating module as claimed in claim 1, wherein a number of the at least one turbulent structure set is a plurality, and the turbulent structure sets are arranged sequentially along a direction perpendicular to the flowing direction.

10. The heat dissipating module as claimed in claim 1, further comprising at least one heat pipe and a heat diffusion structure, wherein the heat diffusion structure is adapted to dispose on a heat generating element, and the heat pipe is connected between the heat diffusion structure and the heat dissipation fin set.

11. The heat dissipating module as claimed in claim 10, wherein each of the heat dissipation fins has at least one opening, the heat pipe passes through the opening, and the opening is disposed at the turbulent structure set.

12. The heat dissipating module as claimed in claim 11, wherein a periphery of the opening has a folding wall, and the folding wall of the opening is adapted to support another adjacent one of the heat dissipation fins.

13. The heat dissipating module as claimed in claim 1, wherein each of the heat dissipation fins has at least one side edge, the side edge is connected between the front side and the rear side and has a folding wall, and the folding wall of each of the heat dissipation fins is adapted to separate another adjacent one of the heat dissipation fins.

14. The heat dissipating module as claimed in claim 1, wherein each of the heat dissipation fins has at least one side edge, the side edge is connected between the front side and the rear side, and the flowing direction is substantially parallel to the side edge.

15. A projection device, comprising:
   an outer casing;

an optical engine, disposed in the outer casing, wherein the optical engine comprises:
- a light source module, adapted to emit an illumination light beam;
- a light valve, adapted to convert the illumination light beam into an image light beam;
- a projection lens, adapted to project the image light beam; and the heat dissipating module as claimed in claim 1, disposed in the outer casing, and adapted to perform heat dissipation for the optical engine.

16. A heat dissipating module, adapted to use in a heat dissipation airflow along a flowing direction, comprising:
- a heat dissipation fin set, comprising a plurality of heat dissipation fins, wherein the heat dissipation fins are stacked on each other, each of the heat dissipation fins has a front side, a rear side opposite to the front side and at least one turbulent structure set, the turbulent structure set is located between the front side and the rear side and has a plurality of first turbulent structures, the first turbulent structures are arranged from the front side to the rear side in sequence, such that when the heat dissipating module used in the heat dissipation airflow, the heat dissipation airflow flows from the front side toward the turbulent structure set along the flowing direction, and passes through the turbulent structure set to flow toward the rear side, and an extending direction of each of the first turbulent structures is tilted relative to the flowing direction,
- wherein the turbulent structure set further comprises a plurality of second turbulent structures, the second turbulent structures are arranged from the front side to the rear side in sequence and aligned with the first turbulent structures respectively, an extending direction of each of the second turbulent structures is tilted relative to the flowing direction, each of the first turbulent structures and the corresponding second turbulent structures are rendered in a V shape structure, each of the V shape structures has a narrow end, and each of the narrow ends face the front side,
- wherein the heat dissipating module further comprises at least one heat pipe, each of the heat dissipation fins has at least one opening, the heat pipe passes through the opening, and the opening is disposed at the narrow end of at least one of the V shape structures of the turbulent structure set.

17. A heat dissipating module, adapted to use in a heat dissipation airflow along a flowing direction, comprising:
- a heat dissipation fin set, comprising a plurality of heat dissipation fins, wherein the heat dissipation fins are stacked on each other, each of the heat dissipation fins has a front side, a rear side opposite to the front side and at least one turbulent structure set, the turbulent structure set is located between the front side and the rear side and has a plurality of first turbulent structures, the first turbulent structures are arranged from the front side to the rear side in sequence, such that when the heat dissipating module used in the heat dissipation airflow, the heat dissipation airflow flows from the front side toward the turbulent structure set along the flowing direction, and passes through the turbulent structure set to flow toward the rear side, and an extending direction of each of the first turbulent structures is tilted relative to the flowing direction,
- wherein the heat dissipating module further comprises at least one heat pipe and a heat diffusion structure, the heat diffusion structure is adapted to dispose on a heat generating element, the heat pipe is connected between the heat diffusion structure and the heat dissipation fin set, each of the heat dissipation fins has at least one opening, the heat pipe passes through the opening, and the opening is disposed at the turbulent structure set.

\* \* \* \* \*